United States Patent [19]

Raffenberg

[11] 3,730,660
[45] May 1, 1973

[54] APPARATUS FOR CONTINUOUSLY PRODUCING TUBULAR BODIES OF FOAMED MATERIAL

[75] Inventor: Hermann-Josef Raffenberg, Ludinghausen, Germany

[73] Assignee: BASF Wyandotte Corporation, Wyandotte, Mich.

[22] Filed: Feb. 23, 1971

[21] Appl. No.: 118,127

Related U.S. Application Data

[63] Continuation-in-part of Ser. No. 760,280, Sept. 17, 1968, abandoned.

[52] U.S. Cl. ................425/122, 425/301, 425/393, 264/47
[51] Int. Cl. ..........................B29c 27/16, B29c 27/28
[58] Field of Search.......................425/122, 224, 115, 425/4, 223, 291, 301, 392, 393; 264/47

[56] References Cited

UNITED STATES PATENTS

| 275,408 | 4/1883 | Philips et al. | 425/122 X |
| 775,540 | 11/1904 | McConnell | 425/122 X |
| 1,810,864 | 6/1931 | Vogt | 425/122 X |
| 1,889,935 | 12/1932 | Ruby | 425/122 X |
| 2,260,081 | 10/1941 | Lefebure et al. | 425/115 X |
| 3,561,048 | 2/1971 | Ernst | 425/122 X |

Primary Examiner—Robert L. Spicer, Jr.
Attorney—Robert M. Phipps et al.

[57] ABSTRACT

An apparatus for continuously making a tubular polyurethane foam insulation adapted to be installed about a pipe or the like combines a stationary mold and a mandrel disposed in the mold with means for convolutely winding a continuous web about the mandrel and out through a slot in the mold wall, means for convolutely winding a second web about the first web and out through the same slot, means for placing a foamable polyurethane mixture between the webs and means for pulling the exposed portions of the webs longitudinally and thereby moving the two radially spaced webs through the mold while the foamable reaction mixture forms a longitudinally split tubular foam body having the first web as a liner and the second as a cover. The product produced by the apparatus and a process for making the product are also provided.

8 Claims, 7 Drawing Figures

Patented May 1, 1973
3,730,660
2 Sheets-Sheet 1
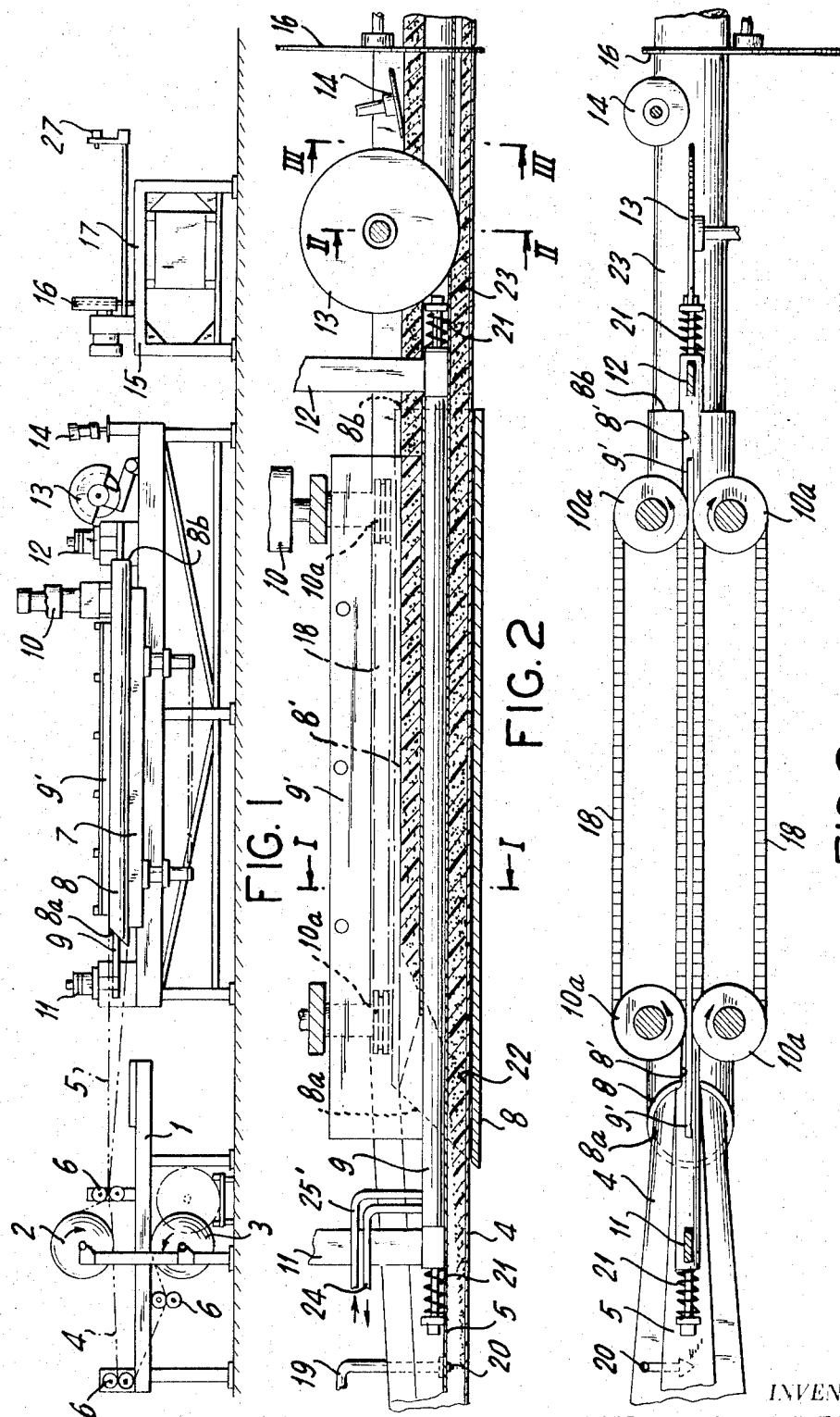
INVENTOR.
HERMANN-JOSEF RAFFENBERG
BY
McGlew & Toren
ATTORNEYS

APPARATUS FOR CONTINUOUSLY PRODUCING TUBULAR BODIES OF FOAMED MATERIAL

This invention relates generally to a method and apparatus for making tubular insulation for pipes and the like and more particularly to an improved apparatus and method for making a tubular polyurethane foam product adapted to be installed quickly and easily about a pipe or similar conduit or vessel to provide thermal insulation. This application is a continuation-in-part of my application Ser. No. 760,280 filed Sept. 17, 1968, now abandoned.

Apparatus for making continuous lengths of polyurethane foam insulation for pipes have been proposed before. One apparatus of this type is disclosed in U.S. Pat. No. 3,118,800. This apparatus convolutely wraps a continuous web about a mandrel and then wraps a second continuous web about the first one. A foamable mixture is placed between the two webs and expands to form an annular layer of foam between the two webs. The edges of the outer web are overlapped to insure that the foamable mixture is confined in the space between the two webs. The apparatus does not provide a mold which encloses the webs as the foamable mixture expands so the thickness of the foam may vary and the product may be out-of-round and not of uniform cross-section.

The apparatus of U.S. Pat. No. 3,383,257 convolutely winds a web inside a mold and coats the inner surface of the web with a foamable mixture to form a tubular foam product. However, this apparatus has the disadvantage of requiring a preformed tubular liner for covering the inner surface of the annular foam layer.

In accordance with the method disclosed in U.S. Pat. No. 2,898,634, a foamable mixture is enclosed in a web and permitted to expand to form a cylindrical product. The edges of the web are brought together after the foaming mix is applied and the edges are sealed together.

An apparatus for molding elongated foam-cored laminates is also disclosed in U.S. Pat. No. 3,429,956. However, this apparatus does not produce a tubular product adapted to completely enclose a pipe or the like.

A method for casting an epoxy resin about a pipe is disclosed in U.S. Pat. No. 3,380,258, but such a method does not produce a product which can be formed about a mandrel and sold for subsequent installation about a pipe.

Accordingly, it is the primary object of the present invention to provide a method of and an apparatus for the continuous production of longitudinally slotted tubular insulation which is economical in cost, is easy to apply, and is formed free of any defects or open spaces which would interfere with its insulating capabilities.

Another object of the invention is to provide foil strips for lining the outer and inner periphery of the tubular insulation during the forming operation.

Still another object of the invention is to utilize one of the foil strips for conveying the foam material into the molding apparatus.

Yet another object of the invention is to shape the foil strips in such a manner that they form a closure for the tubular body at the location of the longitudinally extending slot and also extend from the mold for assistance in conveying the tubular body through the molding operation.

Further, another object of the invention is to adjustably support the apparatus forming the mold to insure the proper formation of the tubular body as the foam material hardens.

Still another object of the invention is to longitudinally slit the tubular body along a line diametrically opposite the longitudinal slot, but without cutting completely through the foil strip lining the outer periphery of the tubular body, so that the tubular body can be easily manipulated during installation on pipe lines and the like.

Moreover, another object of the invention is to remove the edge portions of the foil strips after the tubular body has been formed, however, leaving one edge strip portion for use as a cover for the longitudinal slot after the placement of the tubular body on a pipe line.

Yet another object of the invention is to transversely cut the continuously formed tubular body to the desired lengths.

A further object of the invention is to cool the core member within the mold as the foam material is hardened.

Still a further object of the invention is to provide conveying means for continuously passing the foam material and the foil strip through the mold during the formation operation.

Yet another object of the invention is to provide a tubular body which is easy to form, and is relatively inexpensive.

The foregoing objects and others are accomplished in accordance with this invention, generally speaking, by providing tubular insulation having a longitudinally slotted polyurethane foam wall covered with a sheet material both in the inside and outside and along both sides of the slot and by providing an apparatus and method for continuously producing such a tubular product. Generally speaking, the apparatus combines a stationary tubular mold having a wall provided with a slot extending longitudinally therethrough, a stationary mandrel which extends through the mold and is disposed in radially spaced relationship with the mold wall to provide an annular space therebetween, a plate extending substantially perpendicularly from the top surface of the mandrel through the slot in the mold wall substantially throughout the length of the slot to divide it into two substantially equal portions with means for convolutely winding a first continuous web of windable material about the mandrel with that portion adjacent one edge thereof extending across the annular space and outwardly through the slot on one side of the plate and the portion adjacent the other edge also extending across the annular space of the mold in abutting relationship with the first web but through the slot on the opposite side of the plate and means for convolutely winding a second continuous web with that portion thereof along one edge extending through the slot on one side of the plate and that along the other edge extending through the slot on the other side of the plate. A means is provided for introducing a foamable polyurethane reaction mixture between the two webs and for engaging those portions of the two webs which extend outwardly through the slot and pull the webs longitudinally through the mold.

As will become more apparent from the detailed description with reference to the drawing, the tubular insulation of this invention may be prepared by convolutely winding a first continuous web of windable material about the mandrel of the apparatus herein described with those portions adjacent each edge extending through the slot in the mold wall, convolutely winding a second continuous web loosely about the first web so it is radially spaced therefrom and has those portions adjacent its edges extending through the slot in the mold wall, placing a foamable polyurethane reaction mixture between the two webs and pulling the two webs by those portions extending outwardly from the mold longitudinally to move the webs through the mold as the reaction mixture forms a solid polyurethane foam. The product is cut into suitable lengths after it emerges from the mold.

Any suitable windable web material may be used such as, for example, paper, polyvinyl chloride film, metal foil, polycarbonate film, cloth, scrim, polyethylene film or any other suitable synthetic resinous film, or the like. For convenience, such webs are referred to frequently herein as foils. Any foamable mixture of reactants which will react chemically to form a polyurethane foam or similar synthetic resinous foam may be used. Such mixtures are known in the art, some of which are described for example in the book entitled "Polyurethanes: Chemistry and Technology" by Saunders and Frisch, published by Interscience Publishers, copyright 1962, Library of Congress Catalog Card Number 62-18932.

Therefore in the present invention foil strips are formed into inner and outer liners for an annular molded body and are introduced into a region where support is provided about the outer and inner periphery of the molded body. The foil strips are arranged in such a manner that a continuous longitudinal slot is provided through the molded body. Prior to the passage of the foil strips into the support region the foam material is deposited on one of the strips. The edge portion of the foil strips are arranged to extend radially from the support region and means are employed for conveying the molded body through the support region by engagement with the edge portions of the foil strip.

Apparatus for conveying the foil strip and the foam material through the molding operation is comprised of a pair of endless roller chains which grip the edge portions of the foil strips extending from the mold and convey it through the molding operation.

In the molding operation, a mold tube having a continuous longitudinal slot provides the outer peripheral support in the support region and a mold core member or tube is concentrically disposed within the mold tube as a mandrel and combines with it to form an annular passageway through which the foil strip and the foam material is conveyed during the molding operation.

The mold tube is adjustably supported by a frame member and the core member or mandrel is supported at its ends under spring tension for stabilization with respect to the pressure exerted in the longitudinal direction during the molding operation.

To afford further stability for the mold core, it is provided with a radially extending web or plate which projects through the slot in the mold tube. When the foil strips are formed into the inner and outer surfaces for the tubular body their marginal edge portions are supported by the web and extend outwardly from the longitudinal slot in the mold tube. The web provides a bearing surface for the edge portions which are conveyed along the web by means of the roller chains.

As indicated above, the mold core is adjustably suspended within the mold tube to afford easy and exact positioning in a radial plane.

After the molded tubular body exits from the mold tube it is slit longitudinally by a circular saw, aligned with the longitudinal slot formed in the tubular body. The slit is formed diametrically opposite the slot and is formed so that it does not cut through the foil strip forming the outer liner for the tubular body. In this way when the tubular body is applied to a pipe or the like it can be opened in two halves, with the outer liner forming a hinge, for placement of the tubular body about a pipe line.

Since the edge portions of the foil strips are no longer needed after the tubular body has been formed, a cutter is provided to remove all but one of the edge portions, the remaining edge portion is used as a cover for the longitudinal slot after the tubular body has been installed.

The core member within the mold is hollow and contains a conduit forming an annular passageway between the conduit and the core member for the passage of coolant such as water or other suitable fluid through the core for the removal of heat from the molding operation.

The various features of novelty which characterize the invention are pointed out with particularlity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the Drawings:

FIG. 1 is a schematic side view of an apparatus embodying the present invention;

FIG. 2 is a longitudinal sectional view on an enlarged scale of a portion of the apparatus illustrated in FIG. 1;

FIG. 3 is a top view of the apparatus shown in FIG. 2;

Figure 4:
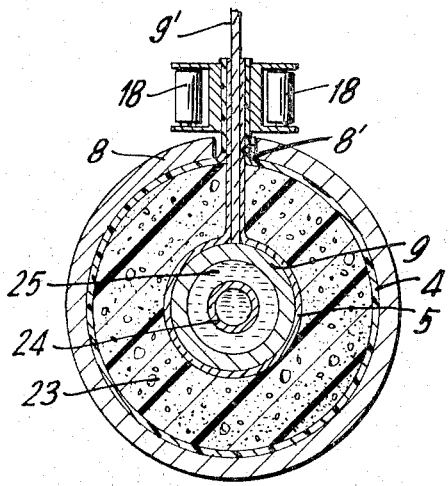
FIG. 4 is a cross-sectional view taken along the line I—I in FIG. 2.
Figure 5:
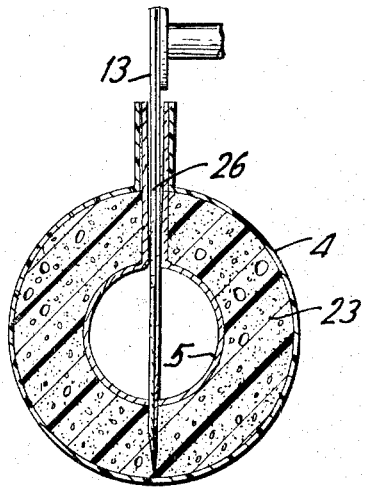
FIG. 5 is a cross-sectional view taken along the line II—II in FIG. 2.

In FIG. 1 the apparatus for forming a molded tubular body is shown formed of three parts, on the left hand side is the conveying means for feeding foil strip and foam material, in the center is the molding apparatus and on the right hand side is the means for cutting the continuously molded tubular body into sections of the desired length. At the left hand end a frame 1 supports a pair of foil rolls 2 and 3 which supply strips or webs of foil 4 and 5 over guide rollers 6 into the molding operation. As the foil strips 4 and 5 are conveyed from the rolls 2 and 3 to the molding apparatus they are transformed from a flat shape into a tubular shape, as is indicated by the illustration in the left hand side of FIGS. 2 and 3.

The molding apparatus comprises a vertically adjustable table frame 7 which supports an outer mold tube 8, a mold core 9, and drive means 10. The mold tube 8 has a longitudinal slot 8' extending for its entire length. At the opposite ends of the frame 7 adjustable devices 11 and 12 are provided for properly suspending the core member 9 in position within the mold tube. The mold tube 8 has an inlet end 8a and an outlet end 8b located at the opposite ends of the frame. At its inlet 8a the mold tube is shaped on a bias for properly leading the foil strip into the mold apparatus.

Spaced from the outlet end 8b of the mold tube is a circular saw 13 whose blade is aligned with the longitudinal slot through the mold tube and extends downwardly to a point below the core member of the molding apparatus. At the end of the frame 7, in back of the circular saw 13, is a cutter 14 extending transversely across the top of the tubular body 23 formed in the mold tube.

Rearwardly from the frame 7 is another frame 15 which supports a saw 16 arranged transversely of the longitudinal axis of the mold tube for cutting the continuous tubular body into desired lengths. A carriage 17 supports the tubular body as it is fed past the saw 16.

After the initiation of the feed of the foil strips 4 and 5 from the foil rolls 2 and 3 the foil strip 4 is shaped to line the inside surface of the mold tube 8 forming the outer periphery of the tubular body. Similarly, the foil strip 5 is shaped in a tubular form and is disposed about the outer surface of the core member 9 forming the inner periphery of the tubular body. The foil strips 4 and 5 are spaced apart and form an annular passageway 22 extending through the molding apparatus. The widths of the foil strips are greater than the respective circumferential dimensions of the inner and outer surfaces of the mold and, as a result, their edge portions 4' and 5' extend radially outward from the mold and are supported on the web 9' of the core member. Preferably, the corresponding edge portions 4', 5' on the opposite sides of the web 9' are joined to one another in a suitable manner so that strips may be easily fed into the mold tube.

The drive 10 includes a pair of roller chains 18 mounted about the spaced end members 10a, 10a of the drive and they engage the edge portions 4', 5' of the foil strips supported by the web or plate 9' for conveying them through the mold tube.

In front of the inlet 8a to the mold tube, liquid mixing components for the foam material are introduced from a supply, not shown, through the line 19 and mixer head 20 onto the foil strip 4, which forms the outer surface of the tubular body to be molded. The mixing components are deposited on the strip and are carried along into the mold tube without any loss. As the foam materials pass through the mold they fill the annular space 22 bounded by the inner and outer surfaces provided by the foil strips 4 and 5, and the continuous longitudinal slot provided by the web 9' supporting the edge portions 5' of the foil strip 5. In addition to forming the longitudinal slot in the tubular body, the web 9' also serves as a guideway for conveying the foil strips through the mold tube by means of the roller chains 18. Moreover, the web 9' also provides a greater stability for the positioning of the core member within the mold tube. Further, the mold core 9 is secured at each end within the suspension devices 11 and 12 by means of springs 21 to afford stability for the core in view of the pressures exerted in the longitudinal direction as the tubular body is formed during its passage through the molding apparatus. That edge of web 9' adjacent core member 9 may be fixedly secured thereto such as by welding.

During the time period in which the foil strips and the components of the foam material are conveyed through the molding apparatus the components within the annular passageway 22 harden and form the continuous molded insulating tube 23 provided with a longitudinally extending slot 26 due to the arrangement of the web 9' of the core member.

The core member 9 is tubular in form and contains a conduit 24 axially arranged within it and spaced from its inner surface for forming an annular flow passage 25 through the core. A supply line 25' is connected to the annular passageway 25 in front of the inlet 8a to the mold tube and supplies coolant to the core for removing the heat of the reaction of the foam materials during the molding operation. Opposite the inlet end of the mold the annular passageway 25 is provided with openings into the conduit 24 for the return flow of the coolant through the core member 8 and it is discharged through a continuation of the line 24.

After the tubular body 23 has been formed within the mold 8, it passes from the outlet end 8b of the mold over the end of the core member 9 and then into the path of the circular saw 13. The saw 13 extends downwardly through the longitudinal slot 26 in the tubular body 23 and slits the foil strip 5 and the portion of the tubular body 23 located diametrically opposite the longitudinal slot. However, in forming the longitudinal slit 26a, see FIG. 6, the saw is positioned so that it does not cut through the foil strip 4 forming the outer liner on the tubular body. When the tubular body or member is being installed as an insulating member on a pipe or the like the foil strip 4 on its outer surface adjacent the longitudinal slit 26a acts as a hinge holding the separated portions of the tubular member together during the assembly operation.

The foil strip 4 forming the outer liner on the tubular member 23 preferably consists of a suitable self-sustaining plastic film such as polyvinyl chloride film to protect the outer surface or periphery of the tubular member. However, the foil strip 5 which lines the inner periphery of the tubular member may be made of paper or any other inexpensive material since its use is required only during the molding operation to prevent the reacting foam materials from sticking to the mold core. After the edge portions 4', 5' of the foil strips have been utilized in conveying the tubular body through the mold tube 8 all but one of the edge portions are removed by means of the cutter 14, see FIG. 6, which extends across the top of the tubular member 23 and cuts one of the edge portions 4' and both of the edge portions 5' of the respective foil strips leaving only one edge portion 4' still attached to the outer surface of the tubular member. The remaining strip 4' is used as a closure for the longitudinal slot of the tubular member after the member has been assembled on a pipe for use as an insulator or the like. After assembly, the closure strip 4' can be secured to the circumference of the tubular member, as by pasting or the like, so that the tubular member is firmly secured on a pipe in a simple manner.

With the longitudinal slit 26a formed in the tubular body 23, and certain of the edge portions 4' and 5' removed from it, all that remains to complete the operation is to cut the continuous section of the tubular member being discharged from the molding apparatus into desired lengths. As the tubular member 23 passes from the frame 7 it is supported on the slide 17 of the frame 15 and a saw 16 which is arranged transversely of the axis of the tubular member is operated by a limit switch 27, see FIG. 1, which actuates the saw when the desired length of the tubular member has been fed passed it. At the completion of the cutting operation the saw is removed to its original position and is ready to be used again for the next cutting operation.

By employing the apparatus disclosed, a plant for molding tubular members of foam material can be operated automatically by electrical drive means. The control for the plant is not shown, however, it is housed in a special switch cabinet and is operated from that location.

Figure 6:
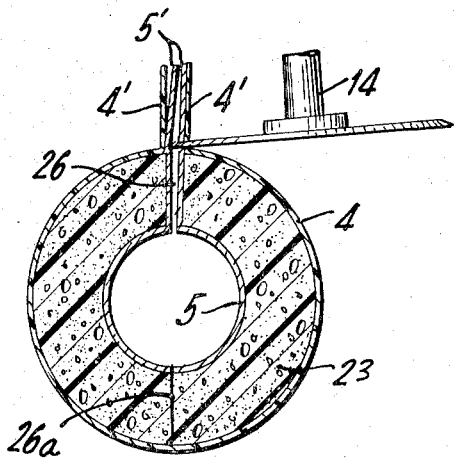
FIG. 6 is a cross-sectional view taken along the line III—III in FIG. 2.
Figure 7:
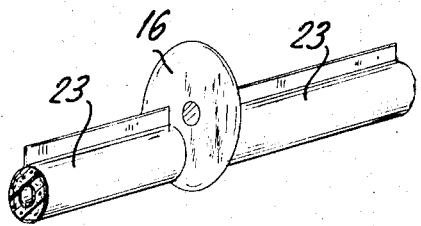
FIG. 7 is a perspective view of a molded body formed by the apparatus in FIGS. 1 to 3 illustrating the operation of cutting the molded body into individual sections or lengths.

As shown in FIG. 6, the method and apparatus described above provides a tubular member 23 formed of a foamed material and provided with a longitudinally extending slot 26 extending radially through one portion of the member. A foil strip, preferably a plastic material provides a cover for the exterior surface of the member, and, after the removal of the excess edge portions 4', 5', the remaining edge portion 4' acts as a closure for the longitudinal slot. On the inner surface or periphery of the tubular member a foil strip 5 provides a lining and also lines the surface of the longitudinal slot from the inner to the outer periphery of the member. The foil strip 5 is used primarily for the molding operation and is not required in the subsequent use of the tubular member while the foil strip 4 provides a protective layer on the exterior surface of the tubular body.

For ease in assembling the tubular body as insulation on a pipe line, the longitudinal slit is provided through the annular portion of the member diametrically opposite the longitudinal slot. The longitudinal slit is cut through the foil strip 5 lining the inner periphery of the member, however, it does not extend through the outer foil strip 4 which acts as a hinge for holding the separated portions of the tubular body together during the assembly operation. When the tubular member is placed on a pipe line, the remaining edge portion 4' is secured to the circumference of the tubular member extending across the longitudinal slot for securing the tubular member firmly in place.

I claim:

1. An apparatus for continuously making tubular insulation having an annular wall of polyurethane foam and adapted to be installed about a pipe or the like comprising a stationary tubular mold having a wall provided with a slot extending longitudinally therethrough, a stationary mandrel extending longitudinally through the mold and disposed in radially spaced relationship with the mold wall to provide an annular space therebetween, a plate extending outwardly from adjacent the mandrel through the slot and longitudinally substantially the length of the slot and dividing the width of the slot into two substantially equal portions, means for convolutely winding a first continuous web of windable material about the mandrel with one edge extending through the annular space and outwardly through the slot adjacent one side of the plate and the other through the annular space and adjacent the opposite side of the plate, means for convolutely winding a second continuous web of windable material about the first web with one edge extending through the slot on one side of the plate and the other edge extending through the slot on the other side of the plate, means for introducing foamable reaction mixture between the two webs, and means for engaging those portions of the webs which extend outwardly through the slot and thereby move the webs longitudinally through the mold.

2. The apparatus of claim 1 wherein that edge of the plate adjacent the mandrel is fixedly secured to the mandrel.

3. The apparatus of claim 1 having means adjacent the exit end of the mold adapted to split longitudinally the polyurethane foam layer diametrically opposite those portions of the web which extended through the slot.

4. The apparatus of claim 1 wherein the means for engaging the portions of the webs extending outwardly from the slot comprises a pair of continuous chains disposed longitudinally adjacent said plate and adapted to press the said web portions against the plate.

5. The apparatus of claim 2 having means spaced longitudinally from the exit end of the mold adapted to remove both portions of the first web and only one portion of the second web from the tubular product.

6. The apparatus of claim 1 wherein the mandrel is hollow and is combined with means for circulating a fluid coolant therethrough.

7. The apparatus of claim 3 comprising means for cutting the resulting product into lengths after it passes through the mold.

8. The apparatus of claim 1 comprising means for adjustably supporting each end of the mandrel.

* * * * *